United States Patent [19]

Kelly

[11] Patent Number: 4,602,478
[45] Date of Patent: Jul. 29, 1986

[54] MARINE GAS TURBINE POWER TRANSMISSION

[75] Inventor: Kenneth R. Kelly, Leicester, England

[73] Assignee: Rolls-Royce Limited, London, England

[21] Appl. No.: 624,770

[22] Filed: Jun. 26, 1984

[30] Foreign Application Priority Data

Jul. 19, 1983 [GB] United Kingdom ............... 8319424

[51] Int. Cl.[4] ............................................. F02C 9/18
[52] U.S. Cl. ............................. 60/39.163; 60/39.33; 192/3.32
[58] Field of Search ............. 60/39.15, 39.161, 39.163, 60/39.29, 39.33, 437, 441; 192/3.32, 3.22, 58 R

[56] References Cited

U.S. PATENT DOCUMENTS

| | | | |
|---|---|---|---|
| 2,655,788 | 10/1953 | Sedille | 60/39.33 |
| 3,495,403 | 2/1970 | Sinclair | 182/58 R X |
| 3,520,138 | 7/1970 | Fox | 60/39.161 X |
| 3,585,795 | 6/1971 | Grieb | 60/39.163 X |
| 3,710,576 | 1/1973 | Evans et al. | 60/39.163 X |
| 3,762,161 | 10/1973 | Pennig | 60/39.163 |
| 4,051,679 | 10/1977 | Collin | 60/39.163 X |
| 4,195,472 | 4/1980 | Robinson | 60/39.163 |
| 4,245,520 | 1/1981 | Semar | 192/51 X |

FOREIGN PATENT DOCUMENTS

| | | |
|---|---|---|
| 637619 | 5/1950 | United Kingdom . |
| 887278 | 1/1962 | United Kingdom . |
| 1361956 | 7/1974 | United Kingdom . |

Primary Examiner—A. Michael Chambers
Assistant Examiner—John C. Fox
Attorney, Agent, or Firm—Cushman, Darby & Cushman

[57] ABSTRACT

A marine gas turbine engine including a fluid coupling between its low pressure turbine and power turbine. During forward drive the fluid coupling is drained so that the exhaust gases from the low pressure turbine drive the power drive in a first direction of rotation. For reverse drive, the fluid coupling is filled so as to couple the low pressure turbine and power turbine and cause the power turbine to rotate in the opposite direction of rotation. When the fluid coupling is operational, the compressor delivery air and low pressure turbine exhaust gases are exhausted to atmosphere.

2 Claims, 1 Drawing Figure

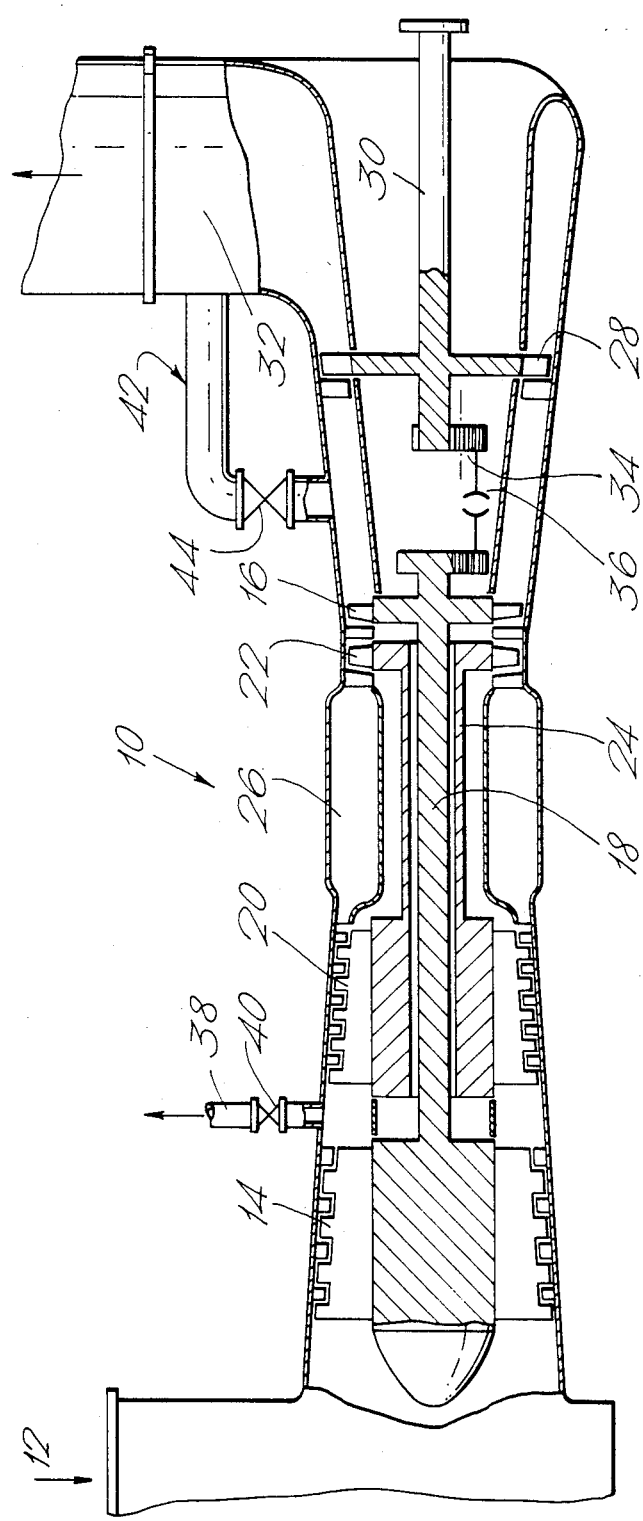

MARINE GAS TURBINE POWER TRANSMISSION

This invention relates to a power transmission, including an arrangement for reversing the propellor thrust direction, for a marine vessel powered by a gas turbine engine.

A marine gas turbine usually comprises a gas generator driving a power turbine which in turn drives the propellor shaft through a speed reducing gear box. The most common methods of reversing the propellor thrust direction comprise a reversing gear in the speed reducing gear box or a variable pitch propellor.

The present invention proposes an alternative method of reversing the propellor thrust direction which avoids the need for a reversing gear or a variable pitch propellor.

The invention proposes that in a gas generator for a marine gas turbine engine which includes high and low pressure compressor and turbine arrangements, the low pressure turbine can be selectively coupled to the power turbine through a fluid coupling so as to drive the power turbine in the opposite direction to that which it is normally driven when providing a forward drive to the marine vessel. At the same time as the fluid coupling comes into operation, at least some of the low pressure compressor delivery air can be exhausted to atmosphere to prevent compressor surge, and at least some of the gas generator gases can be passed to atmosphere to reduce the energy to the power turbine which would otherwise tend to drive the power turbine in the opposite sense to the drive from the low pressure turbine.

In normal operation, in which the marine vessel is moving ahead, the fluid coupling would be drained apart from a small flow for cooling purposes, and the engine would operate in the conventional manner with the coupling slipping.

In order to operate in the reverse direction the fluid coupling is filled and the valves which control the low pressure compressor delivery air exhaust and the gas generator exhaust are opened. The low pressure turbine will then drive the power turbine and thus the propellor shaft by the gear box in the opposite sense to that required for moving ahead.

If necessary, idler or speed changing gears can be used between the low pressure turbine and the power turbine.

The present invention will now be more particularly described with reference to the accompanying drawing which shows a diagrammatic elevation of one form of gas turbine engine for a marine vessel according to the present invention.

Referring to the drawing, a gas turbine engine 10 for a marine vessel (not shown) comprises an intake 12, low pressure compressor 14 drivingly connected to a low pressure turbine 16 by a shaft 18, a high pressure compressor 20 drivingly connected to a high pressure turbine 22 by a shaft 24, and a combustor 26. The gases from the gas generator which is made up of the low and high pressure compressors and turbines, and the combustor, drive a power turbine 28 which drives a gear box input shaft 30, the gases exhaustins through a stack 32.

The low pressure turbine 16 is also drivingly connected to the power turbine 28 through an idler gear 34 and a fluid coupling 36. The low pressure compressor 14 has an exhaust duct 38 controlled by a valve 40, and the low pressure turbine 16 also has an exhaust duct 42 connected to the stack 32, and controlled by a valve 44.

In order to drive the vessel in the ahead direction, the fluid coupling is drained apart from a small flow for cooling purposes, and the gases from the low pressure turbine drive the power turbine to cause the propellor shaft to turn in the ahead direction, the fluid coupling being in the continuous slipping mode.

In order to reverse the vessel direction, the fluid coupling is filled so that the low pressure turbine drives the power turbine through the fluid coupling 36 and the idler gears 34. In this mode of operation, compressor surge is prevented by bleeding low pressure compressor delivery air to atmosphere through the valve 40 and 38 and the exhaust gases from the low pressure turbine are prevented from driving the power turbine in the ahead sense by exhausting these gases to the stack 32 by the duct 42 and valve 44.

The idler gears 34 can be omitted or if they are included may be speed increasing or reducing to match the speeds of the low pressure turbine and the power turbine.

With the arrangement according to the invention, the need for a reversing speed reducing gear box or a variable pitch propellor, to provide a reverse drive is avoided.

I claim:

1. A marine gas turbine engine comprising:
    a gas generator and a power turbine arranged to drive a propeller through a gear box, said gas generator including low and high pressure compressors and low and high pressure turbines respectively coupled to said low and high pressure compressors;
    a fluid coupling for selectively coupling said low pressure turbine and said power turbine;
    said power turbine having a first mode of operation to be driven in a first direction of rotation by exhaust gases of said low pressure turbine when said low pressure turbine and said power turbine are uncoupled by said fluid coupling;
    said power turbine having a second mode of operation to be driven in an opposite direction of rotation by said low pressure turbine when said low pressure turbine and said power turbine are coupled by said fluid coupling; and
    said low pressure compressor and said low pressure turbine each having exhaust means enabling compressor delivery air and low pressure turbine exhaust gases to exhaust to atmosphere when said power turbine is operational in said second mode by being coupled to said low pressure turbine.

2. A marine gas turbine engine as claimed in claim 1 including transmission means to drive said low pressure turbine from said power turbine when coupled by said fluid coupling in said second mode, said transmission means including idler gears.

* * * * *